United States Patent
Leith et al.

[11] 3,894,787
[45] July 15, 1975

[54] HOLOGRAMS

[75] Inventors: Emmett N. Leith, Plymouth; Juris Upatnieks, Ann Arbor, both of Mich.

[73] Assignee: Battelle Development Corporation, Columbus, Ohio

[22] Filed: Dec. 20, 1971

[21] Appl. No.: 209,865

Related U.S. Application Data

[60] Continuation of Ser. No. 825,522, May 19, 1969, abandoned, which is a division of Ser. No. 361,977, April 23, 1964, Pat. No. 3,506,327.

[52] U.S. Cl. .............................................. 350/3.5
[51] Int. Cl.². G03H 1/00; G03H 1/08; G02B 27/22
[58] Field of Search .......... 350/3.5, 162 R, 162 ZP; 96/27 H

[56] References Cited
UNITED STATES PATENTS
3,296,594  1/1967  Van Heerden .................. 350/3.5

OTHER PUBLICATIONS

Rogers, Proc. of the Royal Society of Edinburgh, Vol. 63, pp. 313–325, 1951–52.

Leith et al., Jour. of the Optical Society of America, Vol. 52, No. 10, Oct. 1962, pp. 1123–1130.

Denisyuk, Optics & Spectroscopy, Vol. 15, No. 4, Apr. 1963, pp. 409–410.

Primary Examiner—Ronald J. Stern
Attorney, Agent, or Firm—Woodcock, Washburn, Kurtz & Mackiewicz

[57] ABSTRACT

An off-axis hologram of a 3-dimensional solid object comprising a detector having a pattern of interference fringes constituting a grating-like structure which, when illuminated with coherent light, produces a 3-dimensional image of the solid object.

15 Claims, 19 Drawing Figures

EMMETT N. LEITH
JURIS UPATNIEKS
INVENTORS

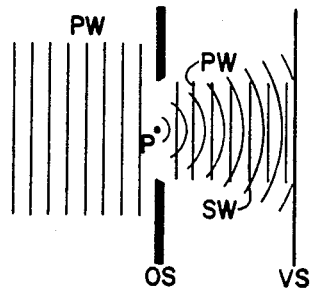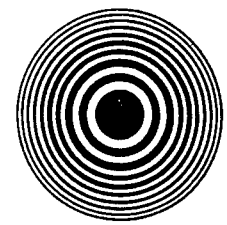
Fig. 5        Fig. 6
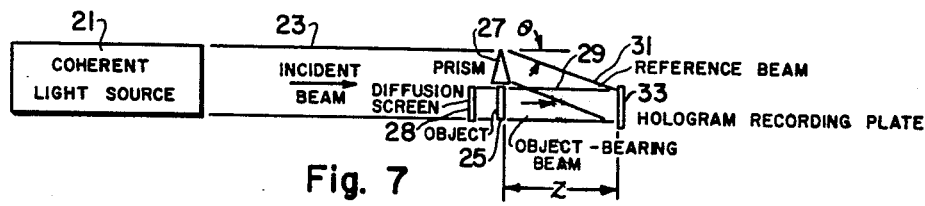
Fig. 7
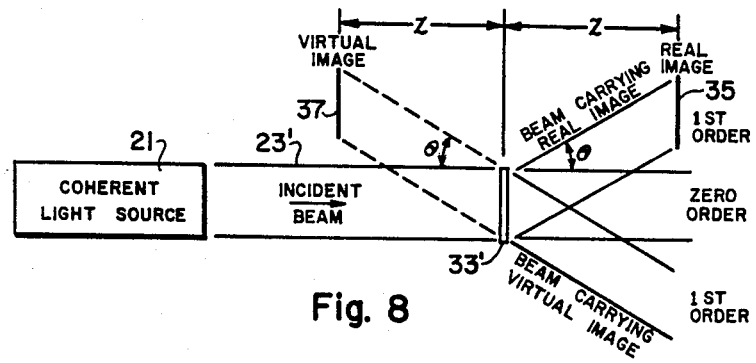
Fig. 8
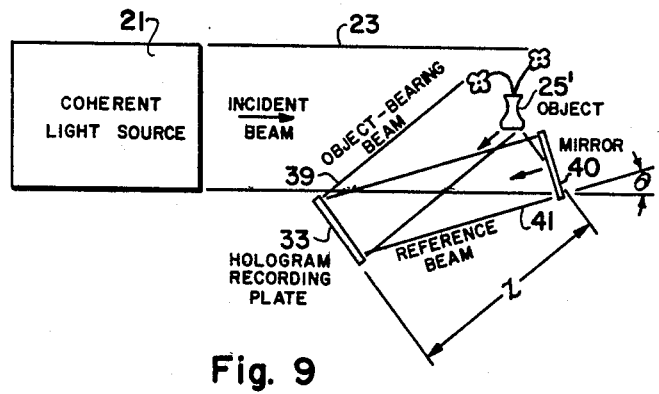
Fig. 9
EMMETT N. LEITH
JURIS UPATNIEKS
INVENTORS

EMMETT N. LEITH
JURIS UPATNIEKS
INVENTORS

EMMETT N. LEITH
JURIS UPATNIEKS
*INVENTORS*

EMMETT N. LEITH
JURIS UPATNIEKS
*INVENTORS*

HOLOGRAMS

This application is a continuation of application Ser. No. 825,522 filed May 19, 1969, now abandoned, which is a division of the parent application Ser. No. 361,977, filed Apr. 23, 1964, now U.S. Pat. No. 3,506,327, issued Apr. 14, 1970.

This invention concerns holograms and their construction and has for an object the production of an off-axis hologram of a three-dimensional solid diffusely reflecting object comprising a detector having a pattern of interference fringes, the fringes constituting a grating-like structure which, when illuminated with coherent light, produces a three-dimensional image of the solid object.

The usual method of producing images is by using lenses, or groups of lenses, whereby a light ray is bent or refracted when it strikes the boundary between two transparent substances. In most instances, the two transparent substances are air and a form of glass. The laws that explain the phenomena of reflection and refraction are grouped under a field of study known as geometrical optics. There are other interesting characteristics of light, and the explanation of these depends on the assumption that light consists of waves. The effects that depend upon the wave character of light are classified under the field known as "physical" optics. Although this invention is based upon principles of both geometrical and physical optics, the explanation of the basic concepts is, in general, to be found in the field of physical optics.

The problem of producing clear images, 3-dimensional images, colored images, enlarged images, etc., has long been attacked by attempting to provide better lenses, better film emulsion, multiple exposures, and other similar techniques and materials. Usually an image is produced by attempting to reconstruct the light patterns as they exist at the surface of the object. Thus, if one can substantially reproduce all the points on the surface of an object, either as light and dark points or as colored points, the image is considered good. Conventionally a lens, a lens system, or an optical system is used to bend light rays emerging from a point (by reflection or other means) on an object to produce a corresponding point separated in space from the original. A collection of such points forms an image. In seeking to provide a well-constructed image, much time and money is required in prior art processes to correct optical system aberrations and to select materials that produce fewer defects in the process of light reflection and transmission.

One object of this invention is to produce an off-axis hologram of the three-dimensional solid object.

Another object of this invention is to produce a complex hologram of a plurality of objects comprising a plurality of holograms superimposed on a common detector.

Another object of this invention is to provide a complex hologram of a multi-colored object comprising a plurality of holograms superimposed on a common detector with each of the holograms having a separate interference pattern characteristic of one of the colors of the object.

Another object of the invention is to produce an artificial off-axis hologram of a solid object made up of a plurality of points and to reconstruct an image therefrom.

In this invention, a wavefront of light rays emerging from an object is captured by a detecting device (preferably a photographic plate of film) to form a pattern and the wavefronts are reconstructed from, and focused by, the detection device or hologram to produce an image that has the same characteristics as an image produced by the original object and an aberration-corrected optical system. According to the present invention, if one moves the eye around in the area where the reconstructed wavefronts are focused, one does not see merely those points that were on a direct line between the object and the detecting device or hologram, but one sees new points coming into view as others go out of view, so that one can look "behind" or around structures in the foreground to see structures in the background. The phenomenon gives one the impression that the image is created by a lens system and the original object is still present, as stated above.

Briefly described, this invention includes a method and apparatus for producing images without lenses comprising, illuminating an object with a source of coherent light, positioning a detecting device to receive light from the object, positioning means for directing a portion of the coherent light onto the detecting device to produce a pattern, and illuminating the pattern on the detector with coherent light to reconstruct a three-dimensional virtual image and a three-dimensional real image.

More specifically, the invention includes the method of and apparatus for constructing and reconstructing holograms of the off-axis type wherein coherent radiation is directed onto an object to provide an object-bearing beam in the path of which is positioned a detector sensitive to the coherent radiation. Radiation coherent with the first-named coherent radiation is directed as a reference beam onto the detector at a finite angle with respect to the object-bearing beam to produce therewith a pattern of interference fringes on the detector in the form of a hologram. The pattern is illuminated with coherent radiation as an illuminating beam, thereby producing an image of the object, and the image is detected along an axis angularly displaced from the illuminating beam.

A preferred source of coherent light is the light produced by a laser and the preferred detector is a photographic plate or film. If the coherent light is collimated, i.e., as though its source were at infinity, the size of the image produced is solely dependent on its distance from the object. If the coherent light is divergent, either for forming the pattern, reconstructing the image, or both, may be enlarged.

The orientation of the portion of coherent light that is directed onto the detecting device determines the position of the images formed by the pattern resulting from the interference between the "object-bearing" beam and the directed beam. If one pattern (with one subject) is formed with the directed light oriented in one manner, and a second pattern is formed (with a second subject) with the directed light oriented in a second manner, two sets of virtual and real images are formed, focused at different locations, and the images can be viewed separately. This process of "stacking" patterns can be continued within the limits of the density produced by the stacked pattern.

Each point on the object produces a pattern that extends over the entire detecting means and any portion of that pattern will reproduce that point for reconstruction of the image. Thus, the detecting means can be broken or cut into pieces and from each piece an image of the same size as the original but of less intensity can be produced if the intensity of the illuminating source is the same for both forming and reproducing the pattern. However, if the illuminating light is concentrated to the size of one piece, the image reproduced from that piece retains its original intensity.

The radiation for producing the pattern need not be light. Any radiation that can be detected and captured by a detecting device will suffice. For example, photographic plates are sensitive to infrared, ultraviolet, X rays, and gamma rays. The invention, therefore, operates with many "types" of radiation. With photographic plates as detectors, it is possible to produce images using radiations having wave lengths of from $10^{-11}$ centimeters to $10^{-1}$ centimeters, the visible spectrum comprising only those wave lengths in the range between $4 \times 10^{-5}$ centimeters (extreme violet) and $7.2 \times 10^{-5}$ centimeters (deep red). According to this invention, since no lenses are involved, radiation that cannot be refrated by ordinary lenses can be put to use to produce types of images heretofore impossible, for example, magnification of shadow images formed from X rays produced from a coherent source.

One advantage of this invention is that a few changes in the system can be made to produce images appearing either much larger than the object, or smaller than the object, as desired, thus introducing magnification or miniaturization without lenses.

Another advantage of this invention is that images in color can be produced without the use of color-sensitive film or plates.

Another advantage of this invention is that the detecting device may be used to correct a lens or optical system, eliminating almost all of the monochromatic aberrations that exist in the lens or optical system.

Still another advantage of this invention is that it may employ detecting devices sensitive to all the same radiations as any photographic process, wherefore images may be produced with radiations outside the visible spectrum.

Still another advantage of this invention is that magnification does not depend upon an optical system. Even images formed by radiations that cannot be refracted by glass can be enlarged by the method and apparatus of this invention, since lenses are not involved.

Still another advantage of this invention is that a plurality of patterns can be recorded on a detecting device and, when the patterns are reconstructed, each pattern produces an image focused at a location that is completely separate and distinct from the location of the other images.

Still another advantage of this invention is that the detecting device may be divided into numerous pieces and each piece can be used to reconstruct the total image.

Still other objects and advantages of this invention will be apparent from the description that follows, the drawings, and the appended claims.

IN THE DRAWINGS:

FIG. 5 is a diagram based on the theory of diffraction of light;

FIG. 6 is a diagram of a Fresnel zone plate;

FIG. 7 is a diagram illustrating a method for producing a hologram;

FIG. 8 is a diagram illustrating a method for reconstruction;

FIG. 9 is a diagram illustrating a method for photographing a solid object without lenses;

Figure 17:
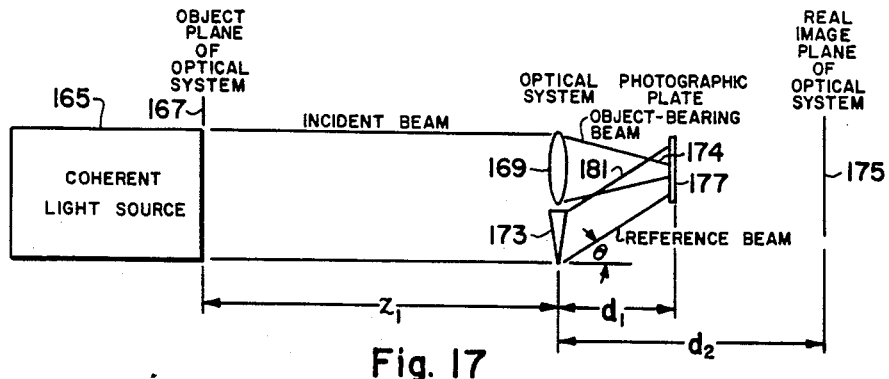
Figure 18:
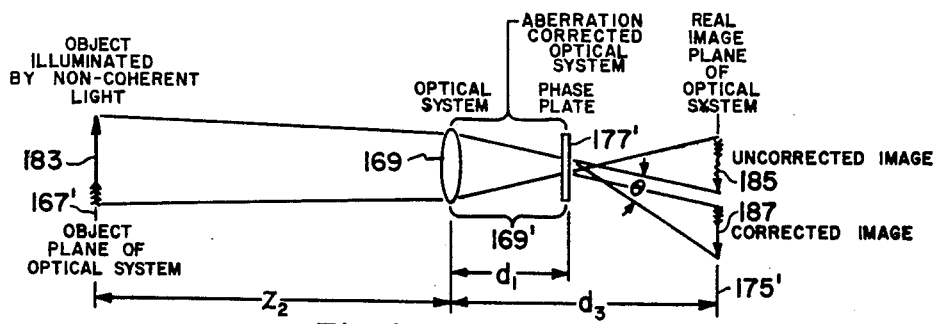
Figure 12:
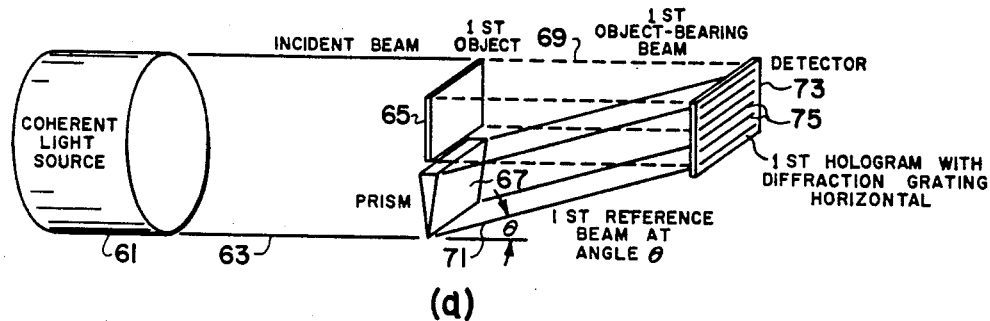
Figure 12:
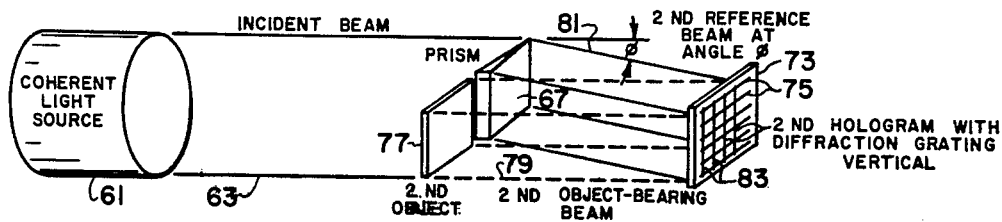
Figure 13:
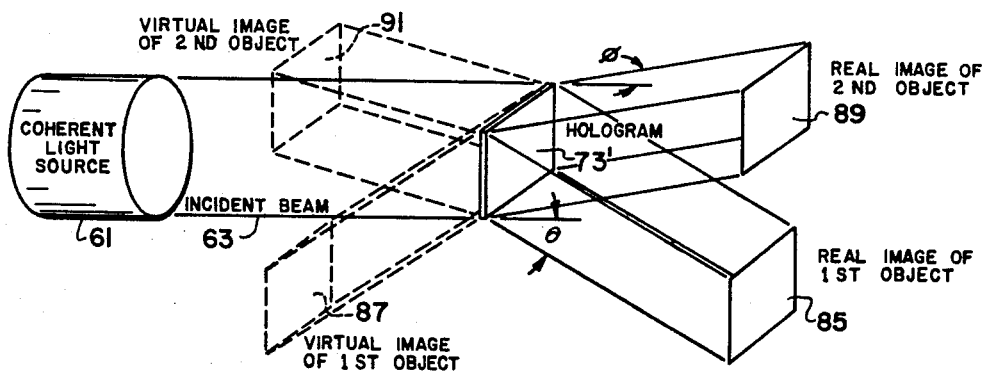
Figure 14:
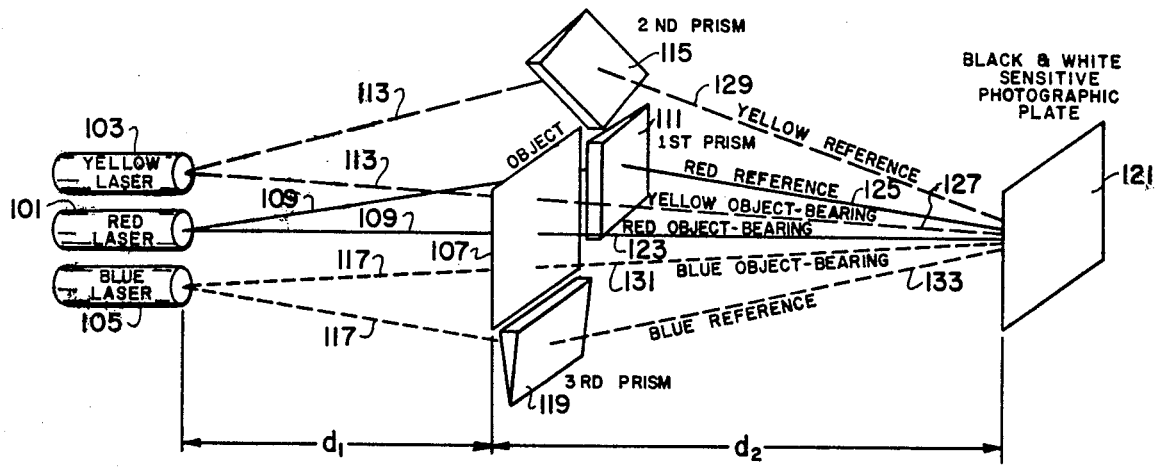
Figure 15:
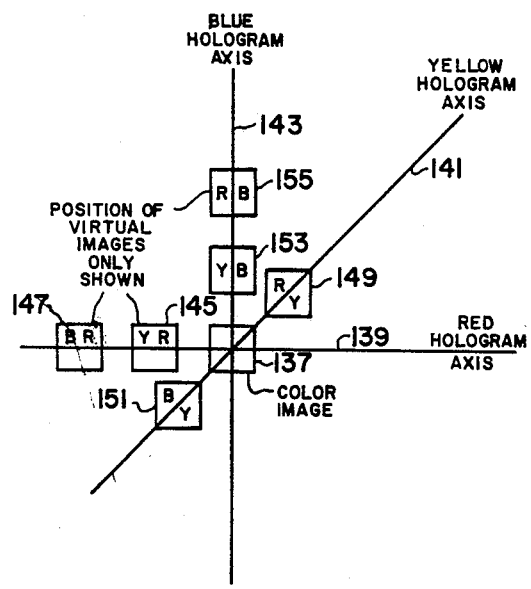
Figure 16:
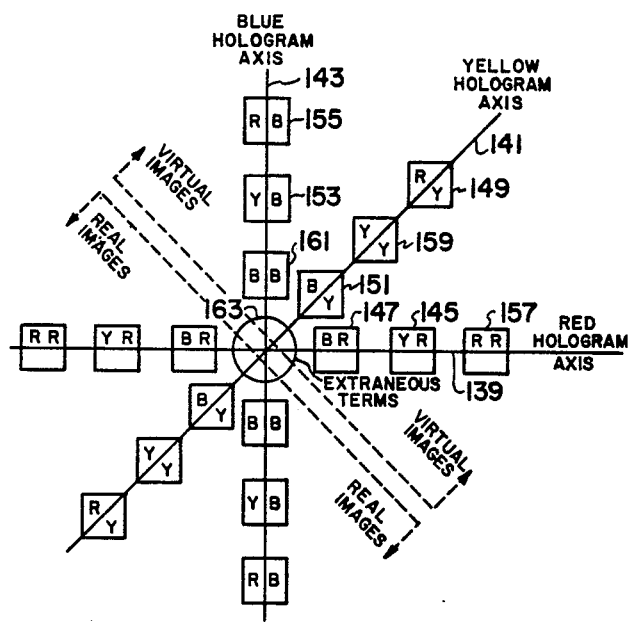

FIG. 12(a) and 12(b) are diagrams illustrating a method for recording images of different objects on one detector;

FIG. 13 is a diagram illustrating the reconstruction of images of a number of objects "stacked" on a complex hologram;

FIG. 14 is a diagram showing a method for producing color images from black and white photosensitive material;

FIG. 15 is a diagram showing the reconstruction of the color image;

FIG. 16 is a diagram showing the various images produced from the method illustrated in FIG. 14;

FIG. 17 is a diagram showing the production of a phase plate for correcting aberrations of optical systems; and FIG. 18 is a diagram showing a corrected optical system by using the phase plate produced by the method illustrated in FIG. 17.

In order to provide a background for understanding the invention described herein, a brief discussion of certain principles in the field of physical optics is given. Amplification of these principles will be found in text books dealing with the subject. FIGS. 1–6 are related to the invention only in that they are used to illustrate certain details of this discussion intended to provide background information preliminary to the actual description of the invention.

According to the theory of wave motion, the passage of a train of waves through a medium sets each particle of the medium into motion. Wave motions can be studied by determining the action of such particles as they are passed by the waves. For example, a particle of water, although participating in the formation and destruction of a passing wave, does not travel with the wave but, ideally, moves up and down in the crest and trough of the wave as it passes. A periodic motion is one which repeats itself exactly in successive intervals of time. At the end of each interval, the position and velocity of the particle is the same as the initial position and velocity, and the time between such occurrences is called a period. The simplest type of periodic motion along a straight line is one in which the displacement (designated as $y$) is given by the equation $$y = r \sin(\omega t + \alpha)$$

Figure 1:
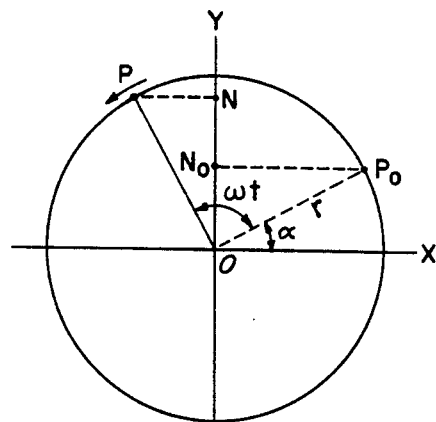
FIG. 1 is a diagram showing a reproduction of the motion of a particle influenced by a sine wave.

1 where $r$ is called the amplitude of the motion, $\omega$ is the angular velocity in radians per second, $t$ is the time in seconds, and $\alpha$ is the phase constant. The entire angle $(\omega t + \alpha)$ determines the position of the particle (N) at any instant and is called the phase angle or simply the phase. The position of N at zero time ($t = 0$) is determined by the angle $\alpha$, which is the initial value of the phase. FIG. 1 shows a construction for determining the position of a particle N at any time. This comprises a circle of radius $r$ having its center at the origin of a coordinate system. The horizontal projection of point P moving on the circumference of such a circle at a constant angular velocity $\omega$, reproduces the displacement of a particle influenced by a sine wave. Point $P_o$, corresponding to the position of the particle at time $t = 0$, is displaced from the axis by an angle $\alpha$ and the magnitude of the initial displacement is represented by the distance $N_o$ measured along the Y axis. After a period of time $t$ the position of the particle ($P_1$) will be determined by the angle ($\omega t + \alpha$) and the displacement will be $N_1$ measured along the Y axis. As the point P moves around the circle and again arrives at $P_o$, it will have completed a "period" and its projection N will have described one complete cycle of displacement values.

Figure 2:
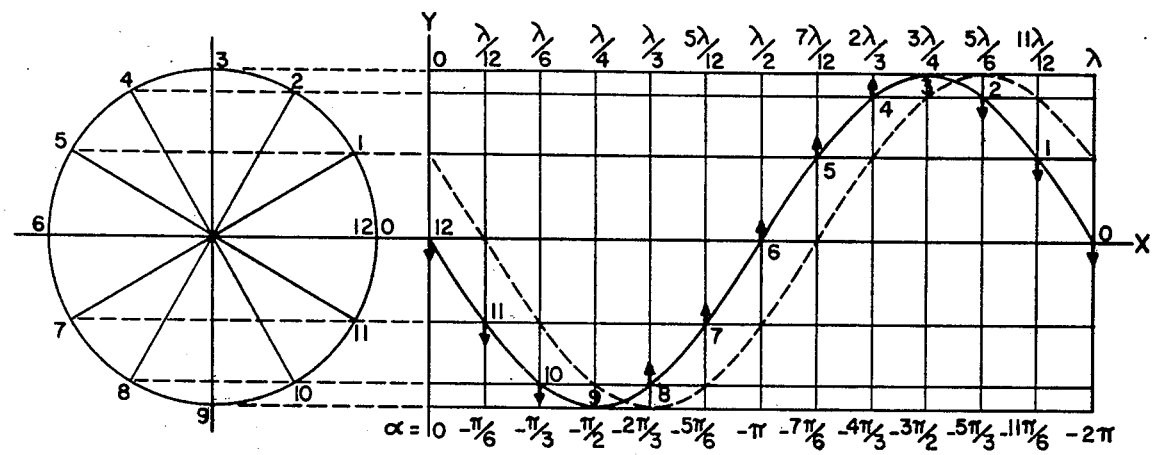
FIG. 2 is a diagram of two sine waves that are thirty degrees out of phase.

FIG. 2 shows graphically the displacement pattern of a particle through one cycle of a sine wave. A group of 12 points has been projected onto a curve, and by connecting such points a picture of the wave appears. The solid line shows a wave where the initial phase angle $\alpha$ was zero, and the broken line shows a wave where the initial phase angle was 30 degrees or ($\pi/6$). The direction of motion of the particle at each position, on the solid line, is indicated by the arrows in FIG. 2. The phase difference in the two waves shown is important in that if the two waves were to be projected through the same medium and oriented along the same axis, at the same time, the result of the particle motion would be an addition of the two waves to form a compound wave. At those points where the waves tend to make the particle move in the same direction, the height or depth of the compound wave would be increased and, at those points where the waves tend to influence the particle to move in opposite directions, they tend to cancel each other out so that the resultant compound wave is moved toward the axis along which it travels. The entire length of the wave, or wave length, is designated $\lambda$. In FIG. 2, the waves are out of phase by the angle ($\pi/6$,) in distance $1/12$ $\lambda$. If they were out of phase by half of a period $\pi$ (or ½$\lambda$), the peaks and valleys would fall in opposite directions and they would tend to cancel each each other out. If the waves were exactly in phase, i.e., on top of one another, the peaks and valleys would reinforce one another, so that the resultant compound wave would have twice the amplitude of either single wave.

Figure 3:
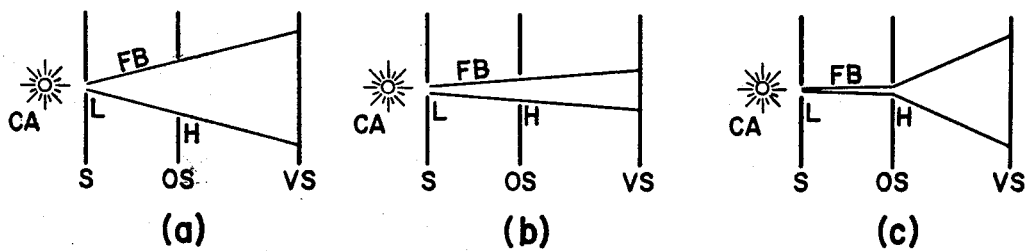
FIG. 3 is a diagram for demonstrating the diffraction of light.

An interesting characteristic of light is exhibited if one attempts to isolate a single "ray" of light by the method shown in FIG. 3. In FIG. 3a, a light source of the smallest possible size is represented by L which might be obtained by focusing the light from the white-hot positive pole of a carbon arc (represented by CA) on a metal screen S pierced with a small hole. This is a convenient way of approximating a "point source" of light which produces a type of coherent light. Coherent light is necessary to this invention and is described later. If another opaque screen OS, provided with a much larger hole H, is positioned between L and a viewing screen VS, only that portion of the viewing screen VS lying between the straight lines FB drawn from L will be appreciably illuminated, as shown in FIG. 3a. If the hole H is made smaller, as in FIG. 3b, the illuminated area on the screen VS gets correspondingly smaller, so that it appears that one could isolate a single ray of light by making the hole H vanishingly small Experimentation along this line reveals, however, that at a certain width of H (a few tenths of a millimeter) the bright spot begins to widen again (FIG. 3c). The result of making the hole H very small is to cause the illumination, although very weak, to spread out over a considerble area of the screen. When waves pass through an aperture, or pass the edge of an obstacle, they always spread to some extent into the region which is not directly exposed to the oncoming waves. The failure to isolate a single ray of light by the method described above is due to the process called "diffraction." In order to explain this bending of light, the rule has been proposed that each point on wavefront may be regarded as a new source of waves.

Figure 4:
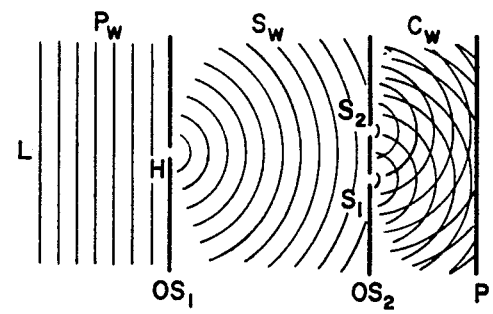
FIG. 4 is a diagram showing the interference of light from a coherent source passing through two slits.

If one were to drop stones simultaneously in a quiet pool of water, one would notice two sets of waves crossing each other. In the region of crossing, there are places where the disturbance is practically zero and others where it is greater than that which would be given by either wave alone. This phenomenon, called the principle of superposition, can also be observed with light waves. FIG. 4 is a diagram illustrating such a phenomenon. The light source L, effectively located at infinity (this effect can be accomplished by using a lens that collimates the light), emits parallel waves of light PW. The parallel waves of light PW strike an opaque screen $OS_1$ having a hole H and the light that gets through the hole H diffracts to form spherical waves SW that pass to a second opaque screen $OS_2$. The second opaque screen $OS_2$ has two slits $S_1$ and $S_2$. The light passing through the two slits $S_1$ and $S_2$ is again diffracted, but in this case, since the two openings are slits $S_1$ and $S_2$, the light waves are diffracted in a cylindrical wavefront pattern as indicated by the designation CW. If the circular lines, designated CW, represent crests of waves, the intersection of any two lines represents the arrival at these two points of two waves with the same phase, or with phases differing by a multiple of $2\pi$ (or $\lambda$). Such points are therefore those of maximum disturbance or brightness. A close examination of the light on the screen P will reveal evenly spaced light and dark bands or fringes.

The two interfering groups of light waves CW are always derived from the same source of light L. If one were to attempt the above experiment using two separate lamp filaments set side by side, no interference fringes would appear. With ordinary lamp filaments, the light is not emitted in an infinite train of waves. Actually, there are sudden changes in phase that occur in a very short interval of time (in about $10^{-8}$ seconds). When two separate lamp filaments are used, interference fringes appear but exist for such a very short period of time that they cannot be recorded. Each time there is a phase change in the light emitted from one of the filaments, the light and dark areas of the fringe pattern change position. The light emitted from the two slits $S_1$ and $S_2$ in FIG. 4 (and other similar arrangements) always have point-to-point correspondence of phase, since they are both derived from the same source. If the phase of the light from a point in one slit suddenly shifts, that of the light from the corresponding point in the other slit will shift simultaneously. The result is that the difference in phase between any pair of points in the two slits always remains constant, and so the interference fringes are stationary. If one is to produce an interference pattern with light, the sources must have this point-to-point phase relation and sources that have this relation are called "coherent sources."

If the number of slits in the screen $OS_2$, is increased and the slits are equidistant and of the same width, the screen $OS_2$ becomes a diffraction grating. When this is done, the number of waves of the type CW increase and the number of interference points increase. The result is that the evenly spaced light and dark bands on the screen change their pattern somewhat as the number of slits is increased. The pattern is modified as the number of slits is increased by narrowing the interference maxima (so that the bright bands on the screen are decreased in width). If the screen P in FIG. 4 is a photographic plate, a series of narrow light bands is produced which may in turn serve as a diffraction grating itself. Two kinds of diffraction patterns are recognized and defined by the mathematics that treats them, i.e., Fresnel diffraction and Fraunhofer diffraction. The latter occurs when the screen on which the pattern is observed is at infinite distances; otherwise the diffraction is of the Fresnel type. The invention is mostly concerned with Fresnel diffraction.

Diffraction also occurs with an opening having an opaque point positioned in the opening. FIG. 5 shows the pattern of light waves produced when the light source is positioned at infinity and parallel waves PW arrive at an opening AB in an opaque screen OS. A point P is positioned in the opening AB and acts like a source producing a train of concentric spherical waves SW, centered at the opaque point P. These wavelets SW combine with the direct beam of waves PW to produce a series of concentric interference rings on the screen VS such as shown in FIG. 6 wherein each white area of the pattern is equal to each of the other white areas and each is covered by a black ring which is equal to each of the other black areas. This pattern is referred to as a zone plate. If the zone plate pattern is again exposed to coherent light, it will produce a point of light of great intensity on its axis at a distance corresponding to the size of the zones and the wavelength of light used, i.e., the light is focused by a pattern rather than a lens. The Fresnel zone plate appears to act as a type of lens. Furthermore, if a small object is positioned in the hole AB of the screen OS of FIG. 5, a Fresnel diffraction pattern is formed from the small object. It would appear that it would be possible to capture a multiple Fresnel diffraction pattern for each point on an object and pass the light through the captured multiple pattern to form an image. To a certain extent, this is true, but it is not quite so simple.

Two major difficulties are encountered if one attempts to produce an image by illuminating an object with coherent light using a point source as described above. First, the light from a point source is very weak. This difficulty is overcome by using the light emitted from a laser. Laser light has the property of point-to-point correspondence of phase, which simply means it produces the coherent light necessary for generating the Fresnel diffraction pattern. Assume that a laser beam is directed onto a photographic transparency and a photographic plate is positioned to capture the Fresnel diffraction patterns resulting therefrom. When coherent light is directed onto the developed plate, a crude image appears. This occurs only with relatively simple objects that transmit a large portion of the light through the object without scattering. The primary difficulty with the process (and accordingly with many three-dimensional imaging processes) is that the phase of the incident beam (the beam directed onto the transparency) is lost. This, in general, makes the reconstruction of an image impossible. If a portion of the light passing through the transparency is not scattered, some of the phase is retained, so that reconstruction of very simple objects, such as black lettering on a white background, is possible. When the object illuminated is more complicated, the loss of phase exacts its toll and light "noise" is generated so as to completely obscure the image if one attempts to reconstruct it.

A two-beam interferometric process may be used to produce a pattern of interference fringes on a detecting device (such as a photographic plate), and this is called a hologram or off-axis hologram. FIG. 7 shows this process in operation. A coherent light source, such as a laser 21, produces an incident beam 23 which illuminates a transparency or object 25 and a prism 27. In order to produce images of improved quality, a diffusion screen 28 (such as ground glass) is placed between the light source 21 and the object 25. The light passing through the transparency produces a beam of scattered light 29 that carries the Fresnel diffraction pattern of each point on the object 25, some of which is captured by a detector such as a photographic plate 33 positioned at a distance z from the object 25. The phase relationship in the beam 29 is almost completely destroyed. The prism 27 bends the other portion of the incident beam 23 through an angle $\theta$ directing a beam of light 31 onto the plate 33. As will be seen in FIG. 7, the reference beam 31 is directed onto the detector 33 at a finite angle $\theta$ with respect to the object-bearing beam 29. This light in beam 31 has retained its phase relationship and produces a pattern of interference fringes when combined with the Fresnel fringes being transmitted in beam 29. The result is a combination pattern of multiple Fresnel fringes and interference fringes, called a hologram. The incident beam 23, deflected through an angle $\theta$, to form the reference beam 31, is preferably about two to ten times stronger in intensity than beam 29.

After the photographic plate is developed, reconstruction is accomplished according to the diagram of FIG. 8. The hologram 33' is illuminated by an incident beam 23' of coherent light and a real image 35 forms at a distance z on one side of the hologram 33', and a virtual image 37 forms at a distance z on the other side of the hologram 33'. The fine line structure of the hologram 33' causes the hologram 33' to act like a diffraction grating, producing a first-order pair of diffracted waves, as shown in FIG. 8. One of these produces the real image 35, occurring in the same plane as a conventional real image, but displaced to an off-axis position with respect to the illuminating beam 23' through the angle $\theta$. The angle $\theta$ and distance z will be the same in the reconstruction process as they were in the hologram-forming process if the same wavelength of light is used in both instances. The images 35 and 37 are of high quality and either the real image 35 or virtual image 37 can be photographed. The real image 35 is more convenient to use since the real image 35 can be recorded by placing a plate at the image position, determined by the distance z and the angle $\theta$, thus avoiding the need for a lens. Hence, the entire process may be carried out without lenses.

The density pattern produced on the plate 33 is such that if one wanted to produce the plate 33 artificially, for example, by hand-drawing the appropriate pattern and photographing it onto a plate, one would do so in the following manner: each point on the object interferes with the reference beam to produce a fringe pattern in which the fringes are circular and concentric, with the outer fringes being more closely packed than the inner ones. The fringe pattern is like a section taken from the Fresnel zone plate (FIG. 6) except that the fringes are shaded, going gradually from transparent to black and then to transparent, whereas the fringes of the usual Fresnel zone plates go from transparent to black in a single, abrupt step. If an object is thought of as a summation of many points, then each point produces a pattern like the one described, but such pattern is displaced from those produced by other points in the same manner that the points themselves are displaced from each other. The hologram is thus the summation of many such zone-plate sections, and one could produce an artificial hologram by drawing a super-imposed zone plate pattern. Of course, the process would be very difficult and could only be done for the most simple objects.

In the absence of the reference beam 31, the photographic plate 33 produces a conventional diffraction pattern. Let the light reflected by the object be a function S of X and y, i.e., S(x,y) and the photographic plate receive the light in accordance with the function $S_o$ of X and y or $S_o(x,y)$. The function $S_o(x,y)$ is a complex quantity having both amplitude and phase, the polar form of which is $$S_o(x,y) = a(x,y)e^{j\phi(x,y)}$$

(2)

where $a$ is the amplitude modulus and $\phi$ is the phase of the impinging light. A photographic plate records only the amplitude factor $a$; the phase portion $e^{j\phi}$ is discarded. The conventional fringe pattern is thus an incomplete record.

The interference pattern produced when the second beam, which is called the reference beam 31, is present, is called a hologram 33'. It is characterized by the fact that the phase portion $\phi$ of the Fresnel diffraction pattern is also recorded. If the reference beam 31 has an amplitude modulus $a_o$, it will produce at the photographic plate 33, a wave of amplitude $a_o e^{j\alpha x}$, where the phase term $e^{j\alpha x}$ results from the beam impinging on the plate 33 at an angle. A beam impinging on a plane at an angle $\theta$ produces (for small values of $\theta$) a progressive phase retardation factor indicated by the exponent $$\left(\frac{j2\pi x\theta}{\lambda}\right)$$

across this plane. Hence, we have the relations $\alpha = 2\pi\theta/\lambda$.

When the reference beam is present, the light amplitude distribution at the hologram recording plane is $a_o e^{j\alpha x} + ae^{j\phi}$. Let us assume that the plate which records this distribution has a response which is linear with intensity, that is, suppose the amplitude transmittance of the plate after development to be given by $$T = T_o - kI$$

(3)

where I is the intensity distribution at the photographic plate 33, $$I = \left| a_o e^{j\alpha x} + ae^{j\phi} \right|^2$$

(4)

and $T_o$ and $k$ are constants determined by the transmittance exposure characteristic of the plate. Equation (3) is, in general, a reasonable approximation to the actual characteristic over a transmittance between about 0.2 and 0.8, measured relative to the base transmittance. The resultant transmittance of the recording plate is, therefore, $$T = T_o - |k\ a_o e^{j\alpha x} + ae^{j\phi}|^2$$
$$= T_o - ka_o^2 - ka^2 - 2ka_o a\cos(\alpha x - \phi)$$

(5)

The plate thus behaves like a square-law modulating device producing a term $2ka_o a\cos(\alpha x - \phi)$ which is the real part of the original Fresnel diffraction pattern, modulated onto a carrier $\alpha$. In the absence of a diffracting object, this term represents a uniform fringe pattern produced by the interference between the two beams. When a diffracting object is present, its Fresnel diffraction pattern modulates this fringe pattern. The amplitude modulus of the diffraction pattern produces an amplitude modulation of the fringes, and the phase portion $\phi$ produces a phase modulation (or spacing modulation) of the fringes.

The present process permits the photographic plate to record both the amplitude modulus and the phase of the Fresnel diffraction pattern. The complete demonstration of this requires that the final term of equation (5) be separable from the remaining terms. The actual method for the reconstruction process has been discussed with reference to FIG. 8.

When the hologram 33' is placed in the collimated beam of monochromatic light, as shown in FIG. 8, the bias term $T_o - ka_o^2$ and the term $ka^2$ combine to form a reconstruction that is essentially the reconstruction produced by the pattern formed where the carrier beam 31 is not used. From this term, a real image forms at a distance $z$ on one side of the hologram 33', and a virtual image forms at an equal distance on the other side of the hologram 33' (these are the low-quality conventional images). As was previously mentioned, the fine-line structure of the hologram which causes the hologram to act like a diffraction grating producing the pair of first-order diffracted waves is embodied in the term $kk_o a\cos(\alpha x - \phi)$. As seen from FIG. 8, the light component comprising the two off-axis images are non-overlapping and both components are removed from the region where the conventional reconstruction occurs (these two images are the high quality images that we seek). A comprehensive mathematical analysis supporting these contentions can be given. However, for the present purpose, if the term $ka_o\ a\cos(\alpha x - \phi)$ of equation (5) is rewritten in its exponential form, $$\tfrac{1}{2}ka_0ae^{j(\alpha x-\phi)} + \tfrac{1}{2}ka_0ae^{-j(\alpha x-\phi)},$$

it is seen that the first exponential term is to within a constant multiplier and an exponential term $e^{j\alpha x}$, exactly the complex function that describes the Fresnel diffraction pattern produced at the plate 33 by the object 25. This term can therefore be considered as having been produced by a virtual image at a distance $z$ from the hologram 33'. The factor $e^{j\alpha x}$ alters this view only in that it results in the virtual image being displaced laterally a distance proportional to $\alpha$. The conjugate term $\tfrac{1}{2}a_0ae^{-j(\alpha x-\phi)}$ produces the real image, which likewise is displaced from the axis, as implied by the factor $e^{-j(\alpha x-\phi)}$.

The results of the method just described are based on the square-law characteristic of the recording plate, as given by equation (3) and a proper term for the recording plate, is a "square-law detector." If this relation is only approximately obtained, there will be higher-order distortion terms present on the hologram. These will, for the most part, give rise to second and higher-order diffracted waves, which, in the reconstruction process, will form additional images at greater off-axis positions, and will therefore be separated from the first-order images. Hence, while it is assumed a specific and approximately realized film characteristic, the actual characteristic is not at all critical to the process, and in no way is it necessary or apparently even desirable to consider controlling this characteristic.

By controlling the relative amplitude of the object-bearing beam 29, for example, by the use of attenuating filters placed in one of the beams, the contrast of the fringe pattern can be controlled. If this contrast were made sufficiently small by attenuating the object-bearing beam, then equation (3) would certainly be made to hold to great accuracy if this were desired. However, if the fringe contrast is too low, the reconstructed image will tend to be grainy. Good reconstructions are, in practice, possible over a wide range of fringe contrasts.

One feature of interest is that the reconstructed image is positive, that is, it has the same polarity as the original object. If the hologram is contact-printed so as to produce a negative of the original hologram, then this negative hologram also produces a positive reconstruction.

FIG. 9 shows a method for producing a hologram using an opaque object 25'. The illuminating light, i.e., the incident beam 23, is coherent light from a source such as a laser 21. A diffusion screen (such as the diffusion screen 28 of FIG. 7) may be placed between the light source 21 and the object 25'. The object 25', which may be any complex pattern, reflects light to a photographic plate 33 as shown by the object-bearing beam 39. A portion of the incident beam 23 is reflected to the photographic plate 33 by a mirror 40, as shown by the reference beam 41. The photographic plate is placed any distance $z$ from the object 25' and the incident beam is reflected through the angle $\theta$. The interference of the two beams 39 and 41 produces a hologram on the photographic plate 33. After the plate 33 is developed, the semitransparent plate 33' is placed in the beam 23' of coherent light, as shown in FIG. 8, and the virtual and real images 37 and 35 appear as three-dimensional images. Both images are a reconstruction of the original object. In the reconstruction, the images are positioned at a distance $z$ and at an angle $\theta$ as shown in FIG. 8.

Figure 10:
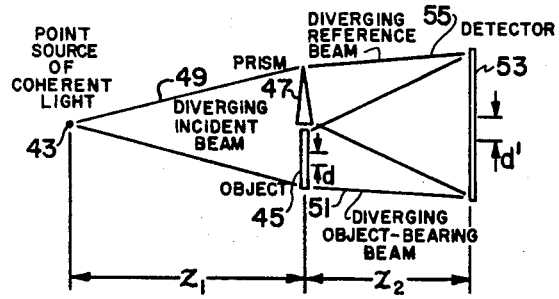
FIG. 10 is a diagram illustrating the first step for magnifying the image size.

The invention can also be embodied in a lensless microscope by a two-step imaging process. The magnifications are as great as any optical microscope and the lensless microscope operates with little or no aberrations over a large field. Referring to FIG. 10, a point source 43 of diverging coherent light illuminates an object 45 and a prism 47 with a diverging incident beam 49. A diverging object-bearing beam 51 is transmitted to a photographic plate 53 and a diverging reference beam 55 is directed by prism 47 onto the photographic plate 53. The object 45 is placed at a distance $z_1$ from the point source 43 and the photographic plate 53 is placed a distance $z$ from the object. It will be understood that FIG. 10 is diagrammatic and that any suitable support means may be used to hold the object 45 and the detector 53 in the respective positions specified above.

Figure 11:
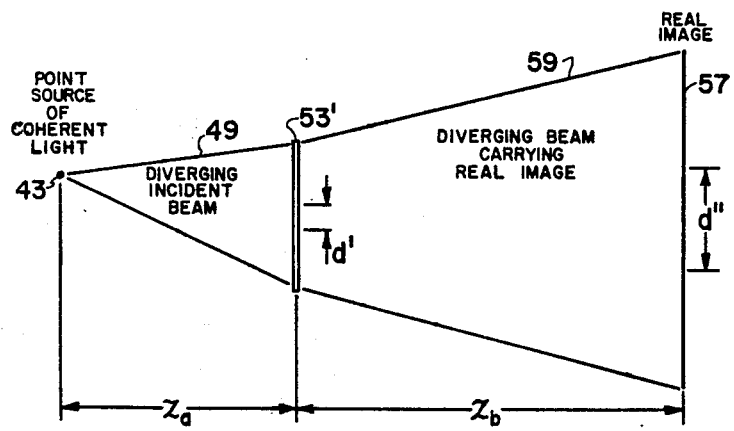
FIG. 11 is a diagram illustrating the second step for magnifying the image size.

FIG. 11 is a diagram showing the developed hologram 53' positioned in the diverging incident beam 49 originating from the point source 43 at a distance $z_a$ from the hologram 53'. A real image 57 is produced by a diverging beam 59 and may be discerned or detected, i.e., observed or recorded, in a plane at a distance $z_b$ from the hologram. It will be noted from FIG. 11 that the beam 59 carrying the real image is at an angle displaced from the axis of the diverging incident beam 49 which illuminates the developed hologram 53'. It will be obvious to those skilled in the art that any suitable support means may be used to hold the developed hologram 53' in the position specified above. It will also be obvious to those skilled in the art that when the real image 57 is to be recorded in a plane at a distance $z_b$ from the hologram, a photographic plate will be positioned in the plane of the real image 57.

To calculate the magnification of the process, note first the magnification produced in the first step of the process shown by the diagram of FIG. 10. Consider two point scatterers on the object 45, separated by a distance $d$. The Fresnel diffraction patterns of these points are similar but separated on the plate 53 by a distance, $$d' = d \frac{z_2 + z_1}{z_1}$$

The magnification ($M_1$) of the first step is therefore $$M_1 = \frac{d'}{d} = \frac{z_2 + z_1}{z_1} \qquad (6)$$

The magnification ($M_2$) produced by the reconstruction process is less obvious. Referring now to FIG. 11, let the hologram 53' be placed a distance $z_a$ from the source 43, and suppose a real image 57 is formed a distance $z_b$ from the hologram. Again, consider the object 45 to have had two points separated by $d$. Their Fresnel diffraction patterns are separated a distance $d'$ on the hologram 53. These diffraction patterns act like the zone plate of FIG. 6, bringing the incident light from the beam 49 to a focus. Each zone plate produces a point focus, whose separation is shown as $d''$ (FIG. 11) and is determined by $$d'' = d' \frac{z_n + z_b}{z_n}$$

The magnification ($M_2$) of the second step is given by $$M_2 = \frac{d''}{d'} = \frac{z_n + z_b}{z_n} = 1 + \frac{z_b}{z_n} \quad (7)$$

To find the over-all magnification, it is necessary to know $z_b$. Consider the distribution of the light on the object to be a function $s$ of $x$ and $y$, i.e., $s(x,y)$. The light passing a distance $z_2$ from the object to the plate and carrying the Fresnel diffraction pattern is represented by $S_o(x,y)$ and $$S_o(x,y) = s(x,y) * \frac{i}{\pi\lambda} e^{j\frac{\pi}{\lambda z_2}(x^2 + y^2)}$$

*Indicating convolution.

The preceding paragraph relates to magnification. Reference is now made to the case of a plane wave reference beam used in the construction process.
The second beam introduces a wave $e^{j\alpha x}$, and the two beams are summed and square-law detected, producing $$\left| e^{j\alpha x} + S_o \right|^2 = 1 + S^2_o + 2\,Re\,(S_o e^{j\alpha x})$$

In the reconstruction process, the final term produces $$S_o e^{j\alpha x} + (S_o e^{j\alpha x})^*$$

* indicating that the term is a complex conjugate.

The first term is a replica of the original wavefront which the plate recorded and, therefore, represents diverging wavelets and produces a virtual image. The second term represents converging wavelets and produces a real image, which, of course, can be photographed without the need for any lenses.

To continue with the calculation of the magnification, the light scattered from a point on the object produces at the hologram the exponent $$\exp\left[-j\frac{\pi}{\lambda z_2}(x^2 + y^2)\right],$$

while for the reference beam, we have $$\exp\left\{-j\left[\frac{\pi}{\lambda(z_1 + z_2)}(x^2 + y^2) + \alpha x\right]\right\}.$$

The recorded zone plate is of the form $$\cos\left[\frac{\pi}{\lambda}(x^2 + y^2)\left(\frac{1}{z_2} - \frac{1}{z_1 + z_2}\right) + \alpha x\right].$$

The recorded hologram thus has a focal length $$f_h = \pm \frac{1}{\frac{1}{z_2} - \frac{1}{z_1 + z_2}}$$

By using the positive sign for the above expression, we find that the focal length may be expressed as follows:

$$f_h = \frac{z_2(z_1 + z_2)}{z_1}$$

The distance $z_b$ is then found by applying the lens formula (where the reciprocal of the object distance plus the reciprocal of the image distance equals the focal length of the lens) to give the zone plate $$\frac{1}{z_b} + \frac{1}{z_n} = \frac{1}{f_h} = \frac{z_1}{z_2(z_1 + z_2)}$$

$$\frac{1}{z_b} = \frac{z_1 z_n - z_2^2 - z_2 z_1}{z_n z_2 (z_1 + z_2)}. \quad (8)$$

The total magnification is therefore $$M = M_1 M_2$$

and from Eqs. (6) and (7) and substituting the value of $z_b$ of Eq. (8) into Eq. (7), we have $$M = \frac{z_1 + z_2}{z_1}\left(1 + \frac{z_2(z_1 + z_2)}{z_1 z_n - z_2^2 - z_2 z_1}\right)$$

$$= \frac{z_n(z_1 + z_2)}{z_1 z_n - z_2(z_1 + z_2)} \quad (9)$$

To make subsequent analysis easier, suppose during the reconstruction step we make $z_1$ equal $z_n$, i.e., the developed hologram photographic plate 53' is put back in the same position in FIG. 11 as the object 45 in FIG. 10 had when the hologram was made. This gives, $$M = \frac{1 + p}{1 - p - p^2} \quad (10)$$

where $p$ equals $z_2/z_1$, and $$\frac{1}{z_b} = \frac{1 - p - p^2}{p(z_1 + z_2)}$$

Another useful expression is $$\frac{1}{z_b} = \frac{1}{z_2}\left(\frac{1 - p - p^2}{1 + p}\right) \frac{1}{M z_2}$$

so that $$z_b = M z_2$$

(11)

Now $z_b$ must be positive if a real image is to be produced, and $z_1$ and $z_2$ are both positive. Therefore, it is required that $$1 - p - p^2 > 0$$

which requires that $$0 < p < \tfrac{1}{2}(\sqrt{5} - 1) \approx .62$$

The lower bound of zero occurs because $p$ is always positive. As an example, if $p$ equals 0.6166 (where $z_2$ equals 30.85mm and $z_1$ equals 50mm) from Eq. (10)

$$M = \frac{1 + .6166}{1 - .6166 - (.6166)^2} = 504 \text{ times}$$

and from Eq. (11)

$$z_b = 15.55 \text{ meters}$$

As previously noted, it is also possible by this invention to put a number of images from different objects on a single photographic plate. FIG. 12(a) is a diagram showing a coherent source of light 61 and its incident beam 63 illuminating a first object 65 and a prism 67. The prism 67 is placed below the first object 65 to deflect the beam from the coherent light source through an angle $\theta$. The object-bearing beam 69 (shown by the dotted line) and reference beam 71, are passed to the photographic plate 73 and form a pattern of interference fringes or a diffraction grating oriented horizontally and indicated by the lines 75—75 (although such lines would not be apparent on the developed film). As shown in FIG. 12(b), after the first exposure is completed, a second object 77 is placed in the incident beam 63 with both the second object 77 and the photographic plate 73 in the same position as the first object 65 and photographic plate 73 were positioned for the first exposure. The prism 67 is now placed to one side of the second object 77 so that the incident beam is deflected through an angle $\phi$. A second object-bearing beam 79 and a second reference beam 81 are passed to the photographic plate 73 and form a second pattern of interference fringes or a second diffraction grating oriented vertically and indicated by the lines 83—83 on the photographic plate 73. After the photographic plate 73 is developed to bring out the complex hologram (75-83), the developed plate or hologram 73' is again positioned in the incident beam 63 of coherent light, as shown in FIG. 13. A real image 85 of the first object will appear at an off-axis angle $\theta$ below the hologram (75-83) on the side opposite the incident beam 63. The virtual image 87 of the first object will be positioned at an off-axis angle $\theta$ below the hologram (75-83) in a plane between the light source 61 and the hologram (75-83) (assuming that the light source is a sufficient distance from the hologram). The virtual image 87 can be viewed by positioning the eyes at an off-axis angle $\theta$ above the hologram (75-83) on the side opposite the incident (e.g., laser) beam 63 (this position and the position for viewing the virtual image 91 of the second object 77 is not shown so that the diagram of FIG. 13 remains uncluttered). The real image 89 of the second object appears at an off-axis angle $\phi$ on the same side of the hologram (75-83) as the prism 67 was placed with reference to the object 77 to produce the hologram 83. The real image 89 and real image 85 are both positioned in a plane perpendicular to the axis of the reference beam. A virtual image 91 of the second object is positioned at an angle $\phi$ with the incident beam and on the same side of the hologram (75-83) as virtual image 87, i.e., between the hologram (75-83) and the coherent light source 61. The virtual image 91 can be viewed by positioning the eyes at an off-axis angle $\phi$ on the opposite side of the hologram (75-83) that is illuminated by the incident light. When the real image 89 appears at an angle $\phi$ on the right side of the hologram (75-83) the virtual image 91 is viewed at an angle $\phi$ on the left side of the hologram (75-83). Additional "stacking" of holograms to form an even more complex hologram is accomplished by simply continuing to expose the plate 73 to one object after another while reorienting the prism 67 at different angles or positions or both for each object.

An extension of the above method may be applied to produce images in color. The preceding description has related only to monochromatic light. FIG. 14 shows a method of producing color images with black and white photosensitive material, such as simple black and white film. A plurality of different colored coherent light sources, for example, a red laser 101 (meaning a laser that produces radiations in the red area of the visible spectrum), a yellow laser 103, and a blue laser 105, are all positioned to illuminate an object 107. The red light 109 (shown by the unbroken line) passes to the object 107 and a first prism 111 positioned, in this example, at the side of the object 107. Only the red light 109 is permitted to pass through the first prism 111. The yellow light 113 (shown by the dashed lines) illuminates the object 107 and a second prism 115 positioned, in this example, at a 45° angle to the horizontal axis of the object. The blue light 117 (shown by the dotted line) illuminates the object 107 and a third prism 119 placed below the object. Only the yellow light 113 illuminates the second prism 115 and only the blue light illuminates the third prism 119. The object 107 and prisms 111, 115, and 119 are positioned in a plane at a distance $d_1$ from the light sources 101, 103, and 105. A combination of six light patterns is transmitted to the black and white sensitive photographic plate 121 positioned at a distance $d_2$ from the object 107. The six light beams are: (1) a red object-bearing beam 123, (2) a red reference beam 125, (3) a yellow object-bearing beam 127, (4) a yellow reference beam 129, (5) a blue object-bearing beam 131, and (6) a blue reference beam 133. Each pair of beams, red (123, 125), yellow (127, 129), and blue (131, 133), produces a pattern of interference fringes each oriented in a separated way on the photographic plate 121. For purposes of description, they will be referred to as the red, yellow, and blue holograms, respectively (although actually the holograms are black and white and are the holograms formed by the red, yellow, and blue light, respectively). The plate 121 is eventually removed, developed, and then repositioned in the same location in FIG. 14, at the distance $d_2$ from the object 107 position. The prisms 111, 115, and 119 remain at their same angular orientation and distance orientation ($d_1$) to the laser light sources 101, 103, and 105. (Of course, if one wishes, the position arrangement of each part can be recorded or redetermined for the reconstruction step.) The only difference in the light arrangements between the hologram forming step and the reconstruction step is that an opaque screen is placed in the position formerly occupied by the object so that the only incident light passing to the complex hologram is from the prisms 111, 115, and 119 (formerly the reference beams). The result is an on-axis, three-dimensional image in color (assuming that the object is three-dimensional). The virtual colored image is located on an axis between the hologram and the opaque screen and is viewed on the side of the plate opposite the illuminating source. A real color image is focused in the on-axis position on the side of the plate opposite the virtual image.

The above method also operates successfully with an opaque object and mirrors instead of prisms. The image will be in color as long as one directs the incident beams for reconstruction into the complex hologram at the same angle that the reference (reflected) beams had for forming the hologram.

An interesting feature of the method described for producing color images is that when viewing the virtual color image, other virtual images may appear in off-axis positions, as shown in FIG. 15. As one views the color image 137, six additional virtual images are lying on three different axes: a red hologram axis 139, a yellow hologram axis 141, and a blue hologram axis 143. (This is purely an arbitrary assignment of terms, indicating merely that the images lying on each axis are derived from the red, yellow, and blue holograms, respectively.) On the red hologram axis 139, there is a yellow image 145 and a blue image 147 resulting from the yellow light and blue light, respectively, striking the diffraction grating of the red hologram. On the yellow hologram axis 141, there is a red image 149 and a blue image 151, resulting from the red light and blue light, respectively, striking the yellow hologram. On the blue hologram axis 143, there is a yellow image 153 and a red image 155, resulting from the yellow light and red light, respectively, striking the blue hologram.

The explanation of the six "extra" images 145, 147, 149, 151, 153, and 155 is shown in FIG. 16. If light is passed directly from all three lasers 101, 103, and 105 (without the prisms) and the complex hologram is viewed from the side opposite the three laser beams, there will be 18 images in all, nine virtual images and nine real images. The reference numerals applied to the elements in FIG. 15 are carried over and applied to the same elements in their changed positions in FIG. 16, for purposes of comparison. The color image 137 has apparently been destroyed, but can be reconstructed again. When a complex hologram is produced by the color method of FIG. 14, each hologram that was formed by one color produces a real and a virtual image for each color used in the reconstruction. Each image of FIG. 16 has been given two letter designations. The real images will be focused in front of the hologram (referring to the front as the side opposite the illuminating light and the back, or behind the hologram, as the illuminated side) and the virtual images behind the hologram. However, the virtual images are viewed by placing the eyes in the position (upper right) shown in FIG. 16 at a distance $d_2$ in front of the complex hologram, while a print from a real image is made in the position of the real images located in the (lower left) positions and at a distance $d_2$ in front of the hologram, as shown in FIG. 16.

Note in FIG. 16 that if the point of a compass was placed at the intersection of the three axes 139, 141, and 143, a circle could be drawn with its circumference intersecting all the images that have B for the first letter. The same is true for all the images that have Y for the first letter and is also true for all of the images having R for the first letter. The first letter of each image designates its color (and the color of the incident beam reconstructing it) and the second letter designates the hologram (the hologram formed by the red, yellow, or blue light in FIG. 14) the image is derived from. The virtual images of FIG. 16 are positioned differently than they are in FIG. 15 because FIG. 15 shows the image positions as they appear when the complex hologram is reconstructed with the light from each laser 101, 103, and 105 passing through the prisms 111, 115, and 119, respectively, with the prisms 111, 115, and 119 in their original positions of FIG. 14. FIG. 16 is a pattern of the virtual images (in the upper right portion of the diagram) when the light from the three lasers 101, 103, and 105 illuminates the complex hologram directly. When the red incident light reaches the complex hologram, it produces three virtual images: One from the red hologram, which is a red image 157 and is labeled RR in FIG. 16 (in this image 157, everything that was red in the object 107 will appear properly red); another image is formed by the red incident light and the yellow hologram, which is also a red image (149) and is labeled RY in FIG. 16 (everything that was yellow in the object 107 will appear red in the image 149); and a third image 155 is formed by the red light and blue hologram and is labeled RB in FIG. 16 (everything that appeared blue in the object 107 will appear red in the image 155). There are also three images 145, 153, and 159 formed when the yellow incident light illuminates the complex hologram. Image 159 is from the yellow incident light and yellow hologram and is labeled YY in FIG. 16. The other two images 145 (YR) and 153 (YB) are from the yellow incident light illuminating the red and blue holograms, respectively. In image 145, the reds of the object 107 will appear yellow, and the blues of the object 107 will appear yellow in image 153. Finally, the blue incident light produces images 147, 151, and 161 when the blue incident light illuminates the complex hologram. The image 161 (BB) is from the blue incident light and the blue hologram (everything in the object 107 that was blue is blue in image 161). In image 147, the reds, and in image 151, the yellows of the object 107 appear blue. The red-appearing images 157, 149, and 155 are positioned further from the intersection of the three axes 139, 141, and 143, because the red light wavelength is longer and is diffracted more by the diffraction grating of each hologram making up the complex hologram. The blue light wavelength is shorter and the blue images 147, 151, and 161 appear closest to the intersection of the axes 139, 141, and 143. The circle 163 in the center of the diagram of FIG. 16 represents the extraneous terms formerly mentioned in the discussion of FIG. 8.

When the prisms 111, 115, and 119 are placed in the original position of FIG. 14 for the reconstruction, the images from each hologram are displaced along their respective axes to give the position shown in FIG. 15, where the RR image 157, the YY image 159, and the BB image 161 are superimposed to form the color image 137. An interesting feature of illuminating the complex hologram through the prisms is (1) that the color image 137 appears and (2) the colors in the color image can be selected by moving the prisms that change the angle of the incident beam of a particular color that is illuminating the complex hologram and thereby move one image out of position in the superimposed image 137 and another image into the superimposed image 137. For example, suppose the angle of the yellow incident beam is changed so as to move the YY image 159 out and the YB image 153 into the superimposed image 137. The color of the image 137 would be changed to the effect that the yellow parts would lose their yellow tones and the yellow would be superimposed on the blues, changing them to green.

Another method of changing the color of the color image 137 is by adding other prisms to the incident-beam system and simply bringing another image into the superimposed image 137. For example, a second incident beam of yellow light could be added through a prism adjusted in such a manner as to simply bring the YB image 153 into superposition with the images 157, 159, and 161. The image 137 now being comprised of images 153, 157, 159, and 161, would have yellow again superimposed on the blue, with the over-all yellows still retained. As a result of this "image changing", one can "paint" the image 137 almost any color desired and also change the color of the real image by superimposing selected real images in the same manner.

A wide beam of light striking a conventional lens parallel to its axis does not focus at a unique point. Fuzzy and distorted images from conventional optical systems are the result of some type of aberration. Both chromatic and monochromatic aberrations contribute to problems in optical systems, and of the two, monochromatic aberrations usually give the lens maker the most costly problems. In the theory concerning monochromatic aberrations, the deviation of any light ray from its prescribed path is expressed in terms of five sums, $S_1$ to $S_5$, called Seidel sums. If a lens were to be free of all aberrations, all five of these would have to be simultaneously and individually equal to zero. With geometrical optics, no optical system can be made to satisfy all these conditions at one time. The sums are therefore treated separately. The aberrations known as the five monochromatic aberrations are named spherical aberration, coma, astigmatism, curvature of field, and distortion. The conventional method of eliminating such aberrations is usually accomplished by constructing a lens from a multiplicity of simple elements, producing doublet, triplet lenses, etc. or by, for example, Schmidt corrector plates.

The method of this invention allows the lens or optical system to "correct itself" by making a hologram of the system, including its aberrations, and then using the hologram, referred to as a "phase plate," as a diffraction grating to produce a highly aberration-corrected optical system. This, of course, is accomplished for merely the cost of the photographic plate and the time required to make the hologram.

FIG. 17 is a diagram illustrating the method of producing a phase plate. A coherent light source 165 is placed in the object plane 167 at a distance $z_1$ from the lens or optical system 169. The incident beam 171 illuminates the optical system 169 and a prism 173. The distance $z_1$ determines the plane in which a real image forms with a particular optical system so that the real image plane 175 is located at a distance $d_2$ from the optical system 169. The distance $z_1$ establishes the distance $d_2$. $z_1$ may, in some optical systems, be variable by only a few millimeters, as in the case of a microscope, or many miles as in the case of a telescope. After $d_2$ is determined, a photographic plate 177 is positioned between the optical system 169 and the real image plane 175 at a distance $d_1$ from the optical system 169 and $d_1$ is less than $d_2$ 1. The object-bearing beam 174 from the optical system 169 and the reference beam 181 deflected at an angle $\theta$ by the prism 173, form a pattern of interference fringes on the photographic plate 177.

After the photographic plate 177 is developed, the hologram or phase plate 177' is replaced in substantially its original position with respect to the optical system 169, i.e., at a distance $d_1$ from the optical system 169, as shown in FIG. 18. With the phase plate 177' in position, any object 183 placed in the object plane 167' at a distance $z_2$ from the optical system will form an uncorrected real image 185 in the conventional system and a corrected real image 187 in an offaxis position by the angle $\theta$. The real image plane 175' will be located at a distance $d_3$, depending on the distance $z_2$. The light for illuminating the object 183 may be of any type that would ordinarily be used for the optical system 169 and, of course, need not be coherent light. The phase plate 177' has the recorded aberration "patterns" of the optical system 169 and these "patterns" diffract the light from the optical system to the off-axis position, omitting the aberrations. The phase plate 177' can now be considered a part of the optical system 169 to form an aberration-corrected optical system 169'.

It will be understood, of course, that, while the forms of the invention herein shown and described constitute the preferred embodiments of the invention, it is not intended herein to illustrate all of the possible equivalent forms or ramifications of the invention. It will be understood that the words used are words of description rather than of limitation and that various changes, such as changes in shape, relative size, and arrangement of parts or steps may be substituted without departing from the spirit or scope of the invention herein disclosed.

What is claimed is:

1. A method of producing an artificial off-axis hologram of a solid diffusely reflecting object made up of a plurality of points comprising:
   a. determining a fringe pattern for each point of the diffusely reflecting object and an angularly displaced reference beam at a hologram plane,
   b. summing said fringe patterns for a plurality of said points, and
   c. recording the summation of fringe patterns of said plurality of points on a photosensitive means capable of being interrogated by coherent light to form diffraction patterns corresponding to said fringe patterns to produce an artificial off-axis hologram of the solid diffusely reflecting object.

2. A method of reconstructing one or more images of a solid diffusely reflecting object made up of a plurality of points recorded as an artificial off-axis hologram produced from a pattern of interference fringes as though resulting from the combination of an object-bearing beam of coherent radiation and a reference beam coherent therewith and angularly displaced with respect to each other at a finite angle wherein a fringe pattern is determined for each point of the object and a reference beam at the hologram plane, the fringe patterns are summed for a plurality of said points, and the summation of fringe patterns of said plurality of points is recorded on photosensitive means capable of being interrogated by coherent light to form diffraction patterns corresponding to said fringe patterns to produce an artificial off-axis hologram of said object comprising the steps of:
   a. illuminating the hologram with coherent radiation as an illuminating beam, thereby producing an image of the object; and
   b. detecting said image of the object along an axis displaced from the illuminating beam by an angle corresponding substantially to the angular displacement utilized between the object-bearing beam and the reference beam when said off-axis hologram was artificially produced.

3. A hologram of an object, said hologram consisting of patterns throughout its length and breadth in the form of regions of varying transmittances structurally corresponding with those formed on a photosensitive recording medium by exposure to an intensity distribution resulting from the interference at said medium throughout its length and breadth of a reference beam of coherent light and diffused light which has interacted with said object and characterized by structure in every portion of said regions which when illuminated with a beam of coherent light produces an image of the entire object.

4. The hologram of claim 3 in which said object is three-dimensional diffusely reflecting and in which said interference patterns of said regions are formed in accordance with the angular disposition of said regions relative to said object whereby portions of the object obscured at one location of a region will be seen by regions at a location not so obscured.

5. The hologram of claim 3 in which said object is transparent and said diffused light is directed through said transparent object to produce an object-bearing beam which interferes at said medium with said reference beam.

6. An off-axis hologram of an object, said hologram consisting of a structure having interference patterns throughout its length and breadth in the form of regions of varying transmittances, any portion of said regions which when illuminated with a beam of coherent light producing an image of the entire object, said regions having been formed on a photosensitive recording medium throughout its length and breadth by exposure to an intensity distribution resulting from the interference at said medium of a reference beam of coherent light and diffused light which has interacted with said object in the form of an object-bearing beam angularly displaced with respect to said reference beam.

7. An off-axis hologram of a three-dimensional diffusely reflecting object, said hologram consisting of a structure having interference patterns throughout its length and breadth in the form of regions of varying transmittances, any portion of said regions which when illuminated with a beam of coherent light producing an image of the entire object, said interference patterns of said regions being formed in accordance with the angular disposition of said regions relative to said object whereby portions of the object obscured at one location of a region will be seen by regions at a location not so obscured, said regions having been formed on a photosensitive recording medium throughout its length and breadth by exposure to an intensity distribution resulting from the interference at said medium of a reference beam of coherent light and diffused light which has interacted with said object in the form of an object-bearing beam angularly displaced with respect to said reference beam.

8. A complex hologram of a plurality of objects, said complex hologram consisting of a plurality of holograms each of a different one of said objects superimposed upon a single photosensitive recording medium characterized by the fact that each of said holograms consists of a structure of interference patterns which direct an incident beam of light in a direction differing from that of the remaining holograms to simultaneously produce different non-overlapping images of each of said objects.

9. A complex hologram of a multi-color object consisting of a plurality of off-axis holograms each made from different selected colors of coherent light superimposed on a common photosensitive recording medium, each of said holograms consisting of a structure having interference patterns in the form of regions of varying transmittances and characteristic of one of said selected colors of said coherent light, said regions having been formed on said photosensitive recording medium by exposure to an intensity distribution resulting from the interference at said medium of a reference beam of coherent light of one of said selected colors and light which has interacted with said object in the form of an object-bearing beam angularly displaced with respect to said reference beam, each of said holograms when illuminated with coherent light of the same selected colors used in making the complex hologram each hologram then producing an image of said object in the original color which formed that hologram along with other images of said object in each of said other colors, the originalcolor images from all the holograms making up said complex hologram being in registry and separated from all of the other images to reproduce said object in its original color.

10. A complex hologram consisting of a plurality of holograms each of a different object superimposed upon a single photosensitive recording medium characterized by the fact that each of said holograms consists of a structure having interference patterns formed upon said recording medium by exposure to an intensity distribution resulting from the interference at said medium of a reference beam of coherent light and light which has interacted with an object in such a manner that said holograms each have interference patterns which direct simultaneously an incident beam of coherent light in different directions to produce non-overlapping images of each of said objects.

11. A hologram of a diffusely reflecting three-dimensional object, said hologram having the characteristic that any portion thereof when illuminated with a beam of coherent light produces an image of the entire object, said hologram having been produced by illuminating the object with a source of coherent radiation to produce reflecting radiation from the object, positioning a detector sensitive to the coherent radiation to receive the reflected radiation from the object, and directing reference radiation coherent with the first-named coherent radiation onto the detector in such manner to interfere with the reflected radiation from the object, the directed reference radiation interfering with the reflected radiation to produce a pattern of interference fringes that are recorded on the detector as a hologram.

12. A hologram of an object, said hologram having the characteristic that any portion thereof when illuminated with a beam of coherent light produces an image of the entire object, said hologram having been produced by directing a first beam of radiation through a diffusion screen onto the object from a source of coherent radiation, positioning a detector to receive the radiation from the object, and directing a second beam of radiation onto the detector from the source at a finite angle with respect to the radiation from the object, the second beam interfering with the radiation from the object to produce therewith a pattern of interference fringes that are recorded on the detector as a hologram.

13. A color hologram of an object having at least two dimensions produced by illuminating the object with a plurality of sources of coherent light, each source of coherent light being of a different color to produce an object-bearing beam of each color, positioning a detector sensitive to each color of the coherent light in the path of the object-bearing beam, and directing light coherent with each color of said coherent light onto the detector at finite angles with respect to the corresponding object-bearing beams to form interference patterns on the detector, the directed light of each color of coherent light being directed onto the detector at a different angle.

14. A complex hologram consisting of a plurality of holograms of portions of a total amount of information superimposed on a common photosensitive recording medium produced by illuminating a first portion of a total amount of information with a source of coherent radiation to provide an object-bearing beam, positioning a detector sensitive to said coherent radiation in the path of said object-bearing beam, directing radiation coherent with the first-named coherent radiation as a reference beam onto the detector at a finite angle with respect to said object-bearing beam to produce therewith a pattern of interference fringes forming a first diffraction grating, illuminating a second portion of the total amount of information with coherent radiation to provide a second object-bearing beam, maintaining the detector in the path of the second object-bearing beam, and directing radiation coherent with the coherent radiation illuminating the second portion of said total amount of information as a second reference beam onto the detector at a finite angle with respect to the second object-bearing beam to produce a second pattern of interference fringes on the detector forming a second diffraction grating, each of the finite angles having a different spatial relation with respect to the detector whereby the second diffraction grating has an orientation different from the first diffraction grating of the complex hologram.

15. An artificial off-axis hologram produced according to the method of claim 1.

* * * * *